April 21, 1964 J. W. CROWNOVER 3,130,389

DIODE BRIDGE-GATED STEPPING REGISTER

Filed Aug. 5, 1958 2 Sheets-Sheet 1

INVENTOR:
Joseph W. Crownover

By Richard K. Ehrlich

Attorney.

INVENTOR:
Joseph W. Crownover
By Richard K. Ehrlich
Attorney

United States Patent Office 3,130,389
Patented Apr. 21, 1964

3,130,389

DIODE BRIDGE-GATED STEPPING REGISTER

Joseph Wirt Crownover, La Jolla, Calif., assignor to Litton Industries of California, Beverly Hills, Calif.

Filed Aug. 5, 1958, Ser. No. 753,256
9 Claims. (Cl. 340—174)

This invention relates to a stepping register and more particularly to a bridge gated stepping register wherein inferior diodes can be utilized without any undesired effect.

Stepping registers using magnetic, or ferroelectric elements, such as magnetic cores, are being used in the computer field in ever increasing numbers. For example, a magnetic core stepping register has been used, in place of a rotating memory drum, as a recirculating register by applying the output of the register back to its input terminals. The core recirculating register is preferable over a memory drum register in that the core recirculating register is simpler to make than a drum memory and is not subject to frictional wear since it contains no moving parts. What is even more important, however, is that for small memories the core recirculating register weighs many times less than drum memories, thereby making the magnetic core recirculating register extremely attractive for use in airborne equipment, where weight is of great importance.

In the prior art, magnetic core stepping registers generally include a plurality of diode rectifiers which served to substantially block undesired interaction between the magnetic cores of the register. However, the relatively high impedance of most diodes makes it necessary for a plurality of input and output windings wound on the magnetic cores to have a large number of turns in order that the desired interaction between magnetic cores can take place. However, windings having a large number of turns are undesirable since they increase the fabrication costs of the register and set an upper limit on the register's speed.

In an effort to overcome these difficulties, extremely high-grade diodes with a somewhat lower impedance than most commercial diodes, have been selected and used in stepping registers. However, these high-grade diodes are generally used in a magnetic core register, the cost of a magnetic core register utilizing these selected high grade diodes is considerably more than if ordinary diodes were used. Furthermore, the cost of manufacture of magnetic core registers could be considerably reduced if diodes fabricated from ceramic materials having semiconductor properties such as lanthanum-barium titanate could be used therein. However, ceramic diodes are of inferior quality and have relatively high impedances so that it would be unthinkable to use such diodes in a magnetic core register of the prior art.

The present invention provides, on the other hand, a bridge gated stepping register capable of being fabricated from inferior diodes, wherein ferroelectric or magnetic memory elements, such as magnetic cores, can be selectively intercoupled so that undesired interaction between the magnetic cores is substantially blocked while desired interaction is permitted.

According to the invention, a first magnetic element having an input and an output winding wound thereon is selectively linked to a second magnetic element by a diode bridge gate which includes a plurality of four inferior diodes. The diode bridge gate is operable to electrically link the output winding of the first magnetic element to the input winding of the second magnetic element so that desired interaction between the elements can take place when an advancing pulse current is applied to the diode bridge gate. The advancing pulse current saturates the four diodes with current so that the dynamic impedance of the diodes is low even though the diodes are of inferior quality. Hence, stepping registers of the invention can be mechanized which are less costly to fabricate. Furthermore, their speed is not limited since inferior diodes are used in such a manner that they appear to have low impedances thereby permitting the input and output windings to have few turns.

In a first embodiment of the invention a stepping register which is illustrative of the invention is mechanized having a series of first, second, third and fourth magnetic core storage units. Each storage unit includes a magnetic core which has an input, an output, and an advance winding would thereon. One of a series of fourth diode bridge gates selectively links the output winding of the first magnetic core storage unit to the input winding of the second magnetic core storage unit. Two of the remaining three diode bridge gates selectively link, in the hereinabove described manner, the second magnetic core storage unit to the third magnetic storage unit and the third magnetic storage unit to the fourth magnetic storage unit, respectively. The last of the four diode bridge gates selectively links the fourth magnetic core storage unit to an output conductor while an input conductor connected to a source of a bivalued input signal is coupled to the input winding of the first magnetic storage unit.

A first advancing pulse current generated by a first pulse generator is applied to the advance winding of the first and third magnetic core storage unit and to the two diode bridge gates linking the first and third magnetic core storage units to the second and fourth magnetic core storage units, respectively, when it is desired to step the information in the first and third magnetic core storage units ahead one unit. A second advancing pulse current generated by a first pulse generator is applied to the advance winding of the second and fourth magnetic core storage units and to the two diode bridge gates linking the second and fourth magnetic core storage units to the third magnetic core storage unit and the output conductor, respectively, when it is desired to step the information in the second and fourth magnetic core storage units ahead one unit. To continuously step the information ahead, the first and second advancing pulse currents are generated alternately, the stepping speed being dependent upon the rapidity with which the first and second advancing pulse currents are applied.

In a second embodiment of the invention a stepping register is mechanized as in the first embodiment of the invention, however, the output of the stepping register is applied to the input winding of the first magnetic core storage unit of the stepping register, thereby mechanizing a recirculating register, in accordance with the teaching of the invention. The recirculating rate of the register is dependent, of course, upon the rapidity with which the first and second advancing pulse currents are generated.

It is therefore an object of the invention to provide a diode bridge gate stepping register wherein inferior diodes may be used without any undesired effect.

It is another object of the invention to provide a plurality of bridge gates which are serially intercoupled.

It is another object of the invention to reduce the dynamic impedance of a diode by saturating the diodes with current.

It is a further object of the invention to provide a diode bridge gated stepping register wherein non-selective diodes can be utilized without any undesired effect.

It is still another object of the invention to provide a diode bridge gated stepping register wherein diodes fabricated from ceramic materials having semiconductor properties can be used.

It is still a further object of the invention to provide a diode bridge gated stepping register wherein a plurality of diode bridge gates are serially interconnected and are gated by an advancing pulse current.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1:
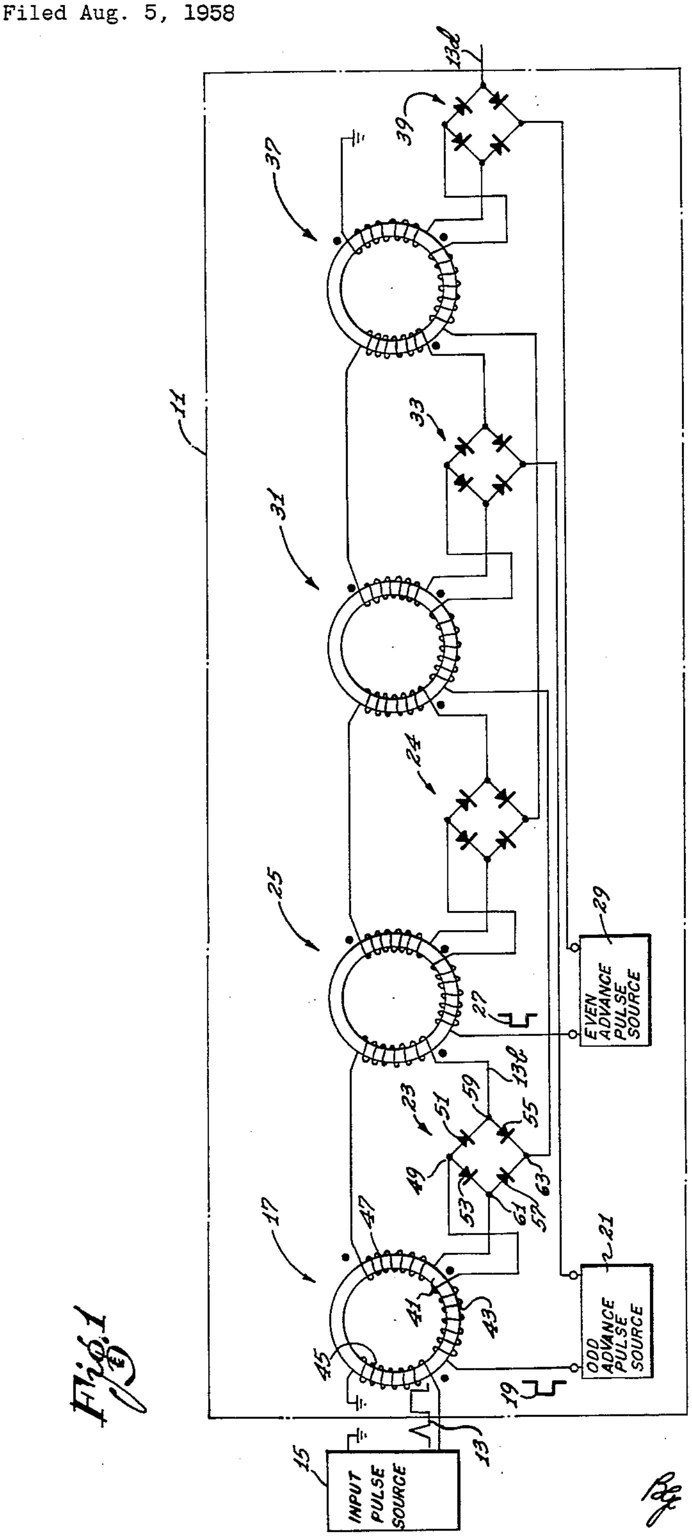
FIG. 1 is a partly block, partly circuit diagram of a stepping register, mechanized in accordance with the invention.

Referring now to the drawings, wherein like or corresponding parts are designated by the same reference characters throughout the several views, there is shown in FIG. 1 a magnetic core stepping register 11, in accordance with the teachings of the invention, wherein a bivalued pulse signal 13 having a "one" value and a "zero" value, generated by a signal source 15, is stored in the stepping register for a predetermined period of time. In more detail, bivalued signal 13 is applied to a magnetic core storage unit 17 within stepping register 11 over a conductor 13 whereby the value of the bivalued signal is stored therein. (For purposes of facilitating and clarifying description, each conductor will be hereinafter similarly designated in terms of the signals applied over the conductor.)

Upon application of an advancing pulse 19, generated by an advancing pulse generator 21, to magnetic core storage unit 17 and a diode bridge gate 23 the value of the bivauled pulse signal stored in core storage unit 17 is transferred through the diode bridge gate to a core storage unit 25. Upon application of an advancing pulse 27, generated by an advancing pulse generator 29, to magnetic core storage unit 25 and a diode bridge gate 24, the value of the bivalued pulse signal stored in core storage unit 25 is transferred through diode bridge gate 24 to a core storage unit 31. When advancing pulse 19 is applied to core storage unit 31 and a doide bridge gate 33 the value of bivalued pulse signal 13 is transferred from core storage unit 31 to a magnetic core storage unit 37 through diode bridge gate 33. Application of advancing pulse 27 to magnetic core storage unit 37 and to a diode bridge gate 39 transfers the value of bivalued pulse signal 13 through diode bridge gate 39 to an output conductor **13*d*** from which the bivalued pulse signal is read out of the stepping circuit.

Referring now in detail to signal source 15, the signal source is operable for generating a positive bivalued pulse signal 13 having either a long duration or a short duration, the long duration pulse being representative of the "one" value and the short duration pulse being representative of the "zero" value. Any number of pulse forming circuits suitable for use as signal source 15 will be evident to one skilled in the art. Therefore, a circuit suitable for use as the signal source will not be herein disclosed.

Figure 2:
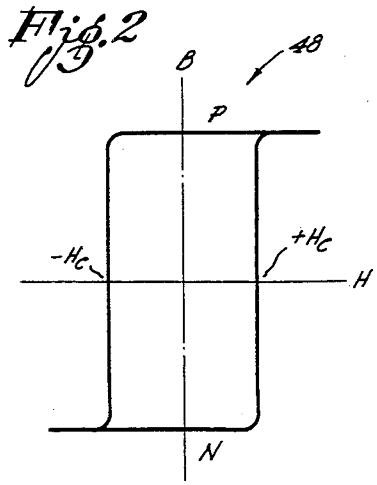
FIG. 2 is a graph of a hysteresis loop of a magnetic element of the invention.

Directing attention now to a detailed discussion of magnetic core storage unit 17, which is representative of magnetic core storage units 25, 31 and 37, magnetic core storage unit 17 includes a magnetic core 41 having an advance winding 43, an input winding 45, and an output winding 47 wound thereon, each of the windings having a dot marked terminal and an unmarked terminal. Magnetic core 41 is fabricated from a magnetic material characterized by a substantially rectangular hysteresis loop. There is shown in FIG. 2 a hysteresis loop 48, somewhat idealized, for a magnetic material having a substantially rectangular hysteresis characteristic. As shown in FIG. 2, each core has a pair of two remanent levels P and N of magnetic induction B at which core 41 exhibits flux saturation. One remanent level corresponds to a flux oriented in one direction while the other level corresponds to flux oriented in the opposite direction. Little or no flux change occurs when the core is driven further into saturation along a horizontal portion of the hysteresis loop, however, when the core is at the N flux level, application of a positive magnetizing force greater than an inherent coercive force $+H_c$ will change the magnetization of the core from the N direction to the P direction, as indicated in FIG. 2. Similarly, application of a negative magnetization force, greater than an inherent coercive force $-H_c$ will change the magnetization of the core from the P direction to the N direction.

In operation, magnetic core 41 is responsive to a current flowing into the dot marked terminal of any of the windings to produce a change in flux in the direction of the P level and to a current flowing into the unmarked terminal of any of the windings to produce a change in flux in the direction of the N level. If, of course, the core is already at the saturated level which lies in the direction in which the applied current tends to change the flux, no change of flux occurs. It should be clear, that conversely a change of flux in the core induces a voltage across the three windings coupled thereto. The polarity of this voltage is such that the marked terminals of the three windings are negative relative to their unmarked terminals if the change of flux is from the P level to the N level. If the change of flux is from the N level to the P level the marked terminals are positive relative to the unmarked terminals.

Referring again to FIG. 1, signal source 15 is connected to the marked terminals of input winding 45 while the unmarked terminals of the input winding is connected to a source of ground potential. The unmarked terminals of advance winding 43 is connected to advancing pulse generator 21 while the marked terminals is connected to a terminal 49 of diode bridge gate 23.

Referring now to diode bridge gate 23, the diode bridge gate links magnetic core storage units 17 and 25 and is operable to pass a transfer current, representative of the value of bivalued signal 13, from magnetic core storage unit 17 to magnetic core storage unit 25 when advancing pulse 19 is applied to the diode bridge gate. As indicated in FIG. 1, diode bridge gate 23 includes four diodes 51, 53, 55 and 57 whose impedances are identical. Hence, bridge gate 23 is a balanced bridge. The anode electrodes of diodes 51 and 53 are connected to terminal 49 while the cathodes of diodes 51 and 53 are connected to a terminal 59 and a terminal 61, respectively. The anode electrodes of diodes 55 and 57 are connected to terminals 59 and 61, respectively, while the cathode electrodes of the two diodes are connected to a terminal 63. Since, as shown in FIG. 1, diode bridge gate 23 is identical to diode bridge gates 24, 33 and 39, the same reference characters are used herein for like elements in diode bridge gates 24, 33 and 39 as are used in diode bridge gate 23.

As shown in FIG. 1, diode bridge gate 23 is linked to magnetic core storage unit 25 by means of a conductor $13_b$ which connects the marked terminal of the input winding of magnetic core storage unit 25 to terminal 59 of diode bridge gate 23. Furthermore, the unmarked terminal of the input winding of magnetic core storage unit 25 is connected to the marked terminal of output winding 47 of magnetic core storage unit 17. Diode bridge gate 23 is linked to magnetic core storage unit 17 by interconnection of terminal 61 and the unmarked terminal of output winding 47. As shown in FIG. 1, terminal 63 of diode bridge gate 23 is connected to the unmarked terminal of the advance winding of magnetic core storage unit 31. Terminal 63 is connected in this manner since the advance windings of magnetic core storage units 17 and 31 as well as diode bridge gates 23 and 33, at terminals 49 and 63, are serially connected with advancing pulse generator 19. On the other hand, the advance windings of magnetic core storage units 25 and 37 as well as diode bridge gates 24 and 39, at terminals 49 and 63, are serially connected with advancing pulse generator 29.

Since the intercoupling of the input and output windings of magnetic core storage units 25, 31 and 37 is similar to that of magnetic core storage unit 17, hereinbefore discussed, no further discussion of the intercoupling is warranted herein. As shown in FIG. 1, the coupling of terminals 61 and 59 of diode bridge gates 24, 33, and 37 is similar to that of the corresponding terminals of coupling except that output conductor $\mathbf{13_d}$ is connected to terminal 59 of diode bridge gate 39.

Referring now to advancing pulse generators 21 and 29, the two generators generate positive square wave pulses, the frequency of the pulses being dependent on the desired frequency of operation of the stepping register. For instance, if it is desired that the stepping register handle a series of bivalued input signals 13 occurring with a frequency of 80 kc., the advancing pulse generators would have to generate positive advancing pulses with a frequency of 80 kc. Since any number of different ways to mechanize such pulse generators would be evident to one skilled in the art no particular structure for the advancing pulse generators will be disclosed herein. It should be noted, however, that it is preferable to mechanize the pulse generators in such a manner that the output terminals of the generators are open circuited during the periods wherein the generators do not generate pulse signals so that advancing pulse 19 will not be reflected into the circuit of advancing pulse 27 and vice versa.

Referring now to the overall operation of the stepping circuit of the invention, the effect of the application of bivalued signal 13 on core 41 of magnetic storage unit 17 must be examined. If bivalued signal 13 having the "one" value is applied to storage unit 17 the magnetization of core 41 will be changed to the P level of flux saturation. If bivalued signal 13 having the "zero" value is applied to storage unit 17 the flux level of core 41 will be unchanged since the "zero" value pulse is not of sufficient duration to change the flux level of the core. However, as is hereinafter discussed, core 41 will have the N level of flux saturation whenever bivalued signal 13 is applied to storage unit 17. This is true since, in the operation of the stepping circuit the application to storage unit 17 of bivalued signal 13 is preceded by the application thereto of advancing pulse 19, the advancing pulse causing core 41 to have the N flux level. More specifically, while the long duration pulse, representative of the "one" value, is sufficient in duration to cause core 41 to change to the P flux level, the short duration pulse, representative of the "zero" level, is not sufficiently long to cause the flux level of core 41 to change. Hence, the value of bivalued signal 13 is effectively stored in core 41.

Upon application of advancing pulse 19 to advance winding 43 of magnetic storage unit 17, a current will flow into the unmarked terminal of winding 43 and the flux level of core 17 will change to the N flux level if it is not already at that level. It is apparent from the foregoing that if core 17 is at the P flux level or, in other words, has a "one" stored therein, a voltage will be produced across output winding 47 having a polarity such that the unmarked terminal of winding 47 is positive with respect to the marked terminal of the winding. Therefore, a transfer current flows from the unmarked terminal of output winding 47 to the marked terminal of the input winding of magnetic core storage unit 25, if gate 23 is open. As will be hereinafter discussed in detail, gate 23 is open since advancing pulse 19 is applied to gate 23 concurrently with the generation of the transfer current. The transfer current flowing through the input winding of storage unit 25 induces a flux change to the P flux level in core 41 of magnetic core storage unit 25, thereby transferring the "one" to magnetic core storage unit 25.

However, if core 41 of magnetic core storage unit 17 is at the N flux level when advancing pulse 19 is applied to core 41, no flux change occurs in the core and no voltage is induced across output winding 47, however, core 41 of magnetic core storage unit 25 is at the N flux level at this time anyway so that the "zero" level stored in magnetic core storage unit 17 is transferred to magnetic core storage unit 25. Core 41 of magnetic core storage unit 25 is at the "zero" level at this time since, as will be hereinafter more fully explained, advancing pulses 19 and 27 are alternately generated. Therefore, prior to the generation and application of advancing pulse 19 to magnetic core storage unit 17 advancing pulse 27 had been generated and applied to the advance winding of magnetic core storage unit 25. As herein mentioned, the application of the advancing pulse to the magnetic core storage unit sets the flux level of the core therein to the N level, therefore, the core of magnetic and storage unit 25 must be at the N level when information is to be transferred thereto from magnetic core storage unit 17. After the value of bivalued signal 13 has been transferred to magnetic core storage unit 25 magnetic core storage unit 17 is available to receive and store another bivalued signal 13.

To transfer the information stored in magnetic storage unit 25, advancing pulse 27 must be applied to the advance winding of the magnetic core storage unit. When advancing pulse 29 is so applied the information stores in the storage unit pertaining to the first bivalued signal 13 is transferred to magnetic storage unit 31. The manner in which the transfer is accomplished is similar to the transfer hereinbefore discussed in connection with the transfer between magnetic core storage units 17 and 25.

As indicated in FIG. 1, advancing pulse 19 is concurrently applied to magnetic core storage units 17 and 31 and gates 23 and 33 so that the information stored in magnetic core storage units 17 and 31 is transferred concurrently, to magnetic core storage units 25 and 37, respectively, upon generation of advancing pulse 19. Then upon generation of advancing pulse 27 the bivalued signal information stored in magnetic core storage unit 25 is transferred to magnetic core storage unit 31 while the bivalued signal information stored in magnetic core storage unit 31 is read out of the stepping register on conductor $\mathbf{13_d}$. Therefore, by alternate generation of the two advancing signals a successive number of bivalued input signals 13 can be stored in the stepping register and reproduced a predetermined time later on conductor $\mathbf{13_d}$. The predetermined time that bivalued signals 13 are stored is dependent upon the frequency of generation of the advancing pulses and the number of cores in the stepping register.

Figures 3, 5:
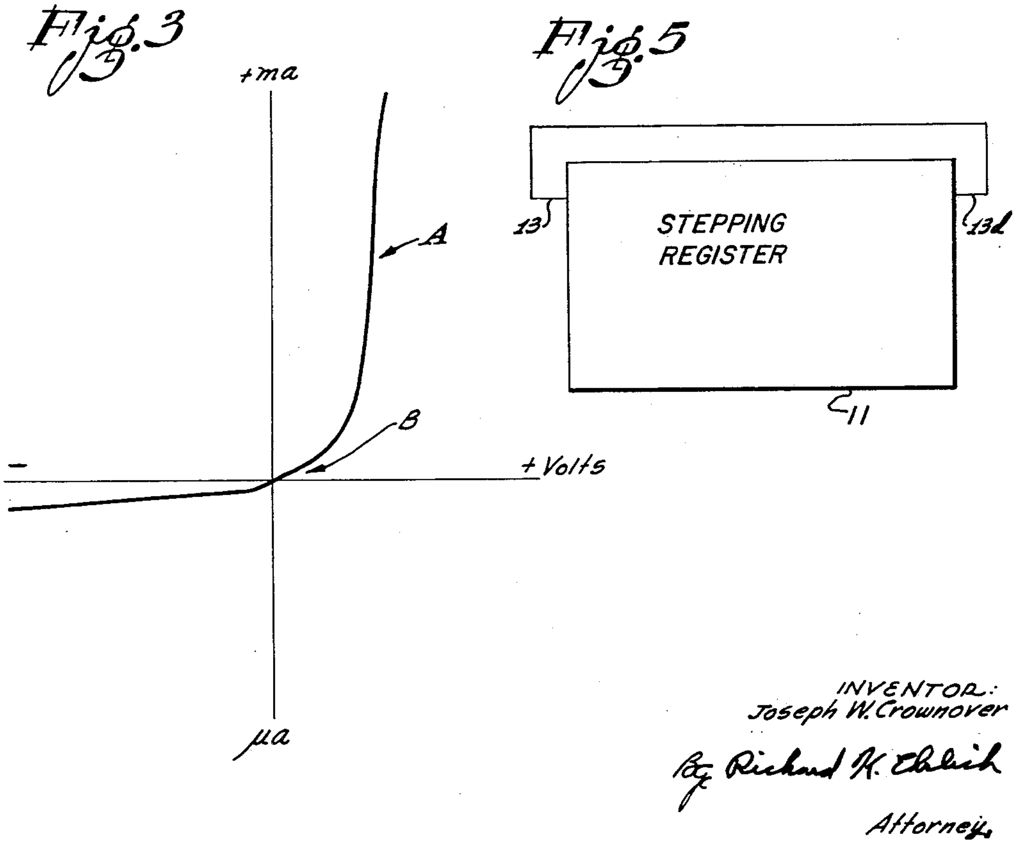
FIG. 3 is a graph of the voltage-current characteristics of a generalized diode.
FIG. 5 is a block diagram of a recirculating register of the invention.

Referring now to the operation of the diode bridge gate, as has been hereinbefore mentioned the gate is selectively operable to pass the transfer current from terminal 61 to 59 when the advancing pulse flows from terminal 49 to terminal 63. In connection with the discussion of operation of the diode bridge gate, attention is directed to FIG. 3, wherein there is presented voltage-current characteristic of a semiconductor diode. As shown in FIG. 3, when a reverse voltage, a voltage having a polarity such that the cathode electrode diode is positive with respect to the anode electrode, is applied to a diode, little or no current flows through the diode, however, if a forward voltage, cathode electrode negative with respect to anode electrode, is applied to a diode the current passing through the diode rises exponentially with the magnitude of the voltage.

As hereinbefore disclosed in the absence of the advancing pulse the transfer current is positive at terminal 61 relative to terminal 59, therefore, the transfer signal is not passed by the gate since the transfer current cannot flow through diodes 53 and 51 because diode 53 is back or negatively biased. Furthermore, the transfer current cannot flow through diodes 57 and 55 to terminal 59 because diode 55 is back biased. In fact, at first impression it appears as if the transfer signal will not pass to terminal 59 even if the advancing pulse flows from terminal 49 to 63. However, the following discussion will fully explain how the transfer current flows through the gate to terminal 59.

It is clear from the foregoing discussion that the polarity of the transfer current is such that it tends to back bias diodes 53 and 55 and forward bias diodes 51 and 57. However, if the magnitude of the voltage difference between terminals 49 and 63 due to the advancing pulse is substantially greater than the voltage difference between terminals 59 and 61 due to the transfer current the four diodes will remain forward biased even when the transfer current is applied to the bridge gate, the forward bias voltage being decreased on diodes 53 and 55 and increased on diodes 51 and 57. Since the four diodes of the bridge gate are forward biased, the transfer current flows through diode 57 in the same direction as the advancing pulse and through diode 55 in the opposite direction to that of the advancing pulse, thereby increasing and reducing the overall current flow through diodes 57 and 55, respectively. The transfer current also flows through diodes 53 and 51 in the same manner that it flows through diodes 55 and 57.

Bearing in mind the foregoing description of operation of the diode bridge gate, it will be evident why inferior diodes having relatively high impedance can readily be used in a stepping register mechanized in accordance with the invention. As shown in FIG. 3, in a conventional stepping register the diodes interconnecting the magnetic core storage units are operated at or near the point B, of FIG. 3 since the only voltage exerted on the diodes is the voltage generated by the output winding. At this point small changes in voltage produce little current flow even in the best of diodes. As shown in FIG. 3, the impedance of any diode can be substantially lowered by applying a relatively large voltage to the diode in order to saturate the diode with current, thereby operating at point A. As shown in FIG. 3, a small voltage change in the neighborhood of point A causes a rather large change in the amount of current passed by the diode. Hence, if the actuating signal is made large enough to cause the diode to operate in the neighborhood of point A a small transfer current voltage will produce a relatively large transfer current even with high impedance diodes. Therefore, ceramic diodes which are relatively inexpensive, can be utilized in the invention yet the number of turns on the input and output winding can still be kept low.

Among other advantageous features of the invention is the fact that the ratio of turns of the input winding to the output winding can be 1 to 1 without any substantial attenuation in the transfer signals generated from the successive magnetic core storage units. It is evident from the foregoing, there is no limit on the number of core storage units that can be successively intercoupled even though a 1 to 1 ratio is used; therefore, a 1 to 1 ratio recirculating register can be mechanized, as is hereinafter more fully described. The advantage of being able to operate with a 1 to 1 ratio is that the stepping register can be easily mechanized, thereby reducing fabrication costs.

It should be herein be noted that the fact that no attenuation occurs in the transfer signals is substantially due to the operation of the diode bridge gates. Hereinbefore, for ease of description it was assumed that none of the advancing pulse current was diverted at terminals 61 and 59 to the transfer current conductors, since the diode bridge gate was balanced. However, even though the bridge is balanced, it is in a sense dynamically unbalanced because the magnitude of the currents flowing through diodes 53 and 55 is different than the magnitude of the currents flowing through diodes 57 and 51. Since more current flows through diode 51 than through diode 53 and through diode 57 than diode 55, some of the advancing pulse current flows from terminal 59 through input winding 45 and output winding 47 to terminal 61 so that the bridge gate tends to become dynamically balanced. This diverted portion of the advancing pulse adds to the normal transfer current and makes up for the energy lost in the transferring operation, thus no noticeable attenuation takes place.

Figure 4:
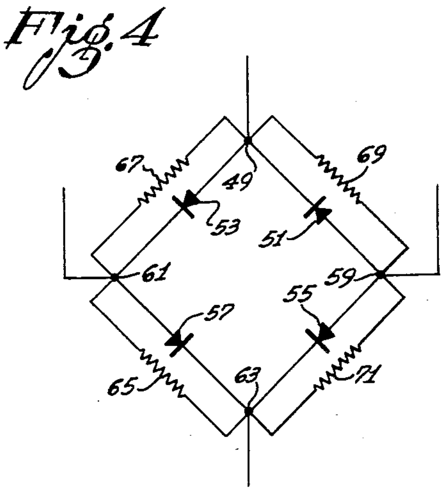
FIG. 4 is a circuit diagram of a diode bridge gate of the invention.

Many modifications and alterations of the first embodiment of the invention shown in FIG. 1 will be evident to one skilled in the art. For example, the effective impedance of the inferior diodes used in the diode bridge gates can be further reduced by mechanizing the diode bridge gates, as shown in FIG. 4. Referring now to FIG. 4, there is shown a series of resistors 65, 67, 69 and 71 which are connected in parallel with diodes 57, 53, 51 and 55, respectively. The resistors further reduce the apparent impedance of the diodes since the impedance of two elements in parallel is less than the impedance of either element alone. The use of parallel resistors is especially useful where it is desired to fabricate the diodes from certain types of ceramic materials that have relatively high impedances.

In addition, as hereinbefore mentioned, the stepping register shown in FIG. 1, can be used as the basic element of a recirculating register, mechanized in accordance with the invention. Such a recirculating register with the input and output windings of the cores having a 1 to 1 turn ratio is shown in FIG. 5.

Referring now to FIG. 5, there is shown a diagram of a recirculating register, in accordance with the teachings of the invention wherein the bivalued signal 13 which is read out of the register on conductor $\mathbf{13_d}$ is reapplied to the stepping register by means of input conductor 13. The herein described feedback operation is accomplished, as shown in FIG. 5, simply by connecting output conductor $\mathbf{13_d}$ to input conductor 13. In operation stepping register 11 is loaded with a series of bivalued input signals 13 from source 15, then the stepping register is allowed to circulate by alternately generating advancing pulses 19 and 27.

A ten core recirculating register of the type shown in FIG. 5 using RCA 222.M2 cores, manufactured by Radio Corporation of America, Camden, New Jersey, has been fabricated and successfully operated at recirculating rates up to 70 kc. The windings were wound with a 1 to 1 ratio, each winding being composed of 30 turns of 41 gauge copper wire. Advancing pulse generators were used which had a pulse rate of 80 kc. and generated on 80 ma. advancing pulse having a 1 microsecond duration.

It is to be expressly understood, of course, that other modifications and alterations may be made in the stepping register of the invention without departing from the spirit and scope of the invention. For example, stored information can be selectively transferred in a direction reverse from that hereinbefore disclosed. More specifically, stored information could be transferred from magnetic core storage unit 37 to magnetic core storage unit 31 by applying advancing pulse 27 to terminals 49 and 63 of diode bridge gate 33. Accordingly, the scope of the invention is to be limited only by the spirit and scope of the appended claims.

What is claimed as new is:

1. In a device for shifting an electrical signal in response to an advancing pulse signal, the combination comprising: a first and a second magnetic core, each of said cores exhibiting a substantially rectangular hysteresis loop to have first and second magnetic states; a first winding wound on said first magnetic core and a second winding wound on said second magnetic core; an advancing pulse generator selectively generating the advancing pulse signal; a diode bridge gate coupled to said first and second windings and responsive to the advancing pulse signal to selectively electrically connect said first and second windings; an advance winding wound on said first core; coupling means serially interconnecting said advance pulse generator, said advance winding, and said diode bridge gate for applying the advancing pulse signal to said advance winding to turn said first core to said second magnetic state thereby generating a voltage across said first winding and to apply the advancing pulse signal to said diode bridge gate to transmit the voltage to said second winding.

2. In a stepping memory device which is responsive to an applied advancing signal to step stored electrical signals representative of information, the combination comprising: a plurality of storage elements, each of said storage elements including apparatus for storing the electrical signals in said storage elements; a plurality of linking means for selectively, electrically, linking in cascade, predetermined ones of said storage elements, each of said linking means connecting a different pair of said storage elements and including a diode bridge gate having a pair of control terminals, and coupling means for serially applying the advancing signal to said diode bridge gate at said control terminals whereby said linking means electrically link the predetermined ones of said storage elements when said advancing pulse is generated.

3. The combination defined in claim 2 wherein each of said storage elements includes an advance winding and said coupling means further includes apparatus for serially connecting said advance windings of said predetermined ones of said storage elements and said control terminals of said diode bridge gate.

4. A stepping register for stepping a pattern of electrical signals, said register comprising: first, second and third memory elements, each characterized by having a substantially rectangular hysteresis loop; a first transfer link including a diode bridge gate having first and second control terminals, said diode bridge gate selectively interconnecting said first and second memory elements in response to the application of a first predetermined advancing signal to said control terminals; first and second advance windings affixed to said first and second memory elements, respectively; a source of the first predetermined actuating signal; first coupling means for serially connecting said first advance winding and said control terminals of said first transfer link to said source of the first predetermined advancing signal whereby information is shifted from said first memory element to said second memory element upon generation of said first predetermined advancing pulse; a second transfer link including a diode bridge gate having first and second control terminals, said diode bridge gate selectively interconnecting said second and third memory elements in response to the application of a second predetermined advancing signal; a source of the second predetermined advancing signal; and second coupling means for serially connecting said second advance winding and said control terminals of said second transfer link to said source of the second predetermined advancing signal whereby information is shifted from said second memory element to said third memory element upon generation of said second predetermined advancing pulse.

5. The combination defined in claim 4 wherein each of said memory elements includes a magnetic core.

6. The combination defined in claim 5 wherein said diode bridge gate includes first, second, third and fourth diodes, each having an anode and a cathode electrode, and coupling means for coupling the anode electrodes of said first and second diodes to said first control terminal and the cathode electrodes of said first and second diodes to the anode electrodes of said third and fourth diodes and the cathode electrodes of said third and fourth diodes to said second control terminal.

7. In a device for shifting a pattern of electrical signals representative of information in response to an advancing signal, the combination comprising: a plurality of successive magnetic cores, each having first, second and third windings wound thereon; a plurality of diode bridge gates corresponding to predetermined ones of said magnetic cores each of said diode bridge gates having first and second control terminals and first and second gated terminals; first coupling means for eletrically coupling each of said diode bridge gates to said corresponding magnetic core and said magnetic core preceding said corresponding magnetic core, said second winding of said magnetic core preceding said corresponding magnetic core being coupled to said first gated terminal of said diode bridge gate and said first winding of said corresponding core being coupled to said second gated terminal of said diode bridge gate; and second means for applying the advancing signal to said third winding of every alternate successive one of said magnetic cores and to said first and second control terminals of said diode bridge gates whose first gated terminal is coupled to said second winding of said magnetic core which has the advancing signal applied thereto.

8. The combination defined in claim 7 wherein each of said diode bridge gates include first, second, third and fourth diodes, each of said diodes having an anode and a cathode electrode, and second coupling means for connecting the anode electrodes of said first and second diodes to said first control terminal and the cathode electrodes of said first and second diodes to said first and second gated terminals, respectively, said anode electrodes of said third and fourth diodes being connected to said first and second gated terminals, respectively, the cathode electrodes of said third and fourth diodes being connected to said second control terminals.

9. The combination defined in claim 8 wherein said diode bridge gate further includes first, second, third, and fourth resistors and third coupling means for coupling said first, second, third and fourth resistors in parallel with said first, second, third and fourth diodes, respectively.

References Cited in the file of this patent

UNITED STATES PATENTS

| | | |
|---|---|---|
| 2,731,203 | Miles | Jan. 17, 1956 |
| 2,850,649 | Schroeder | Sept. 2, 1958 |
| 2,851,675 | Paivinen | Sept. 9, 1958 |
| 2,926,298 | Newhouse | Feb. 23, 1960 |